Figure 1:
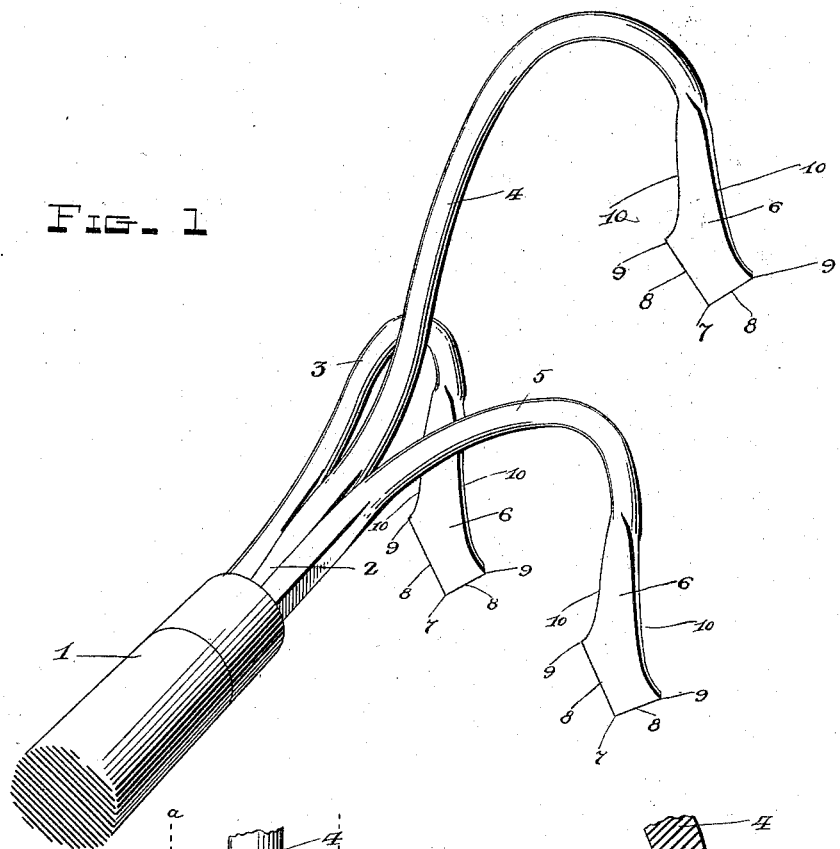

No. 611,641. Patented Oct. 4, 1898.
J. MILLER.
GARDEN IMPLEMENT.
(Application filed Aug. 3, 1898.)

(No Model.)

Witnesses

Inventor
Jacob Miller

UNITED STATES PATENT OFFICE.

JACOB MILLER, OF GOBLESVILLE, INDIANA.

GARDEN IMPLEMENT.

SPECIFICATION forming part of Letters Patent No. 611,641, dated October 4, 1898.

Application filed August 3, 1898. Serial No. 687,628. (No model.)

*To all whom it may concern:*

Be it known that I, JACOB MILLER, a citizen of the United States, residing at Goblesville, in the county of Huntington and State of Indiana, have invented certain new and useful Improvements in Garden Implements; and I do declare the following to be a full, clear, and exact description of the invention, such as will enable others skilled in the art to which it appertains to make and use the same.

My invention relates to improvements in garden implements; and the object is to provide a simple, inexpensive, and effective implement of this character for hand cultivation.

To this end the invention consists in the construction, combination, and arrangement of the device, as will be hereinafter more fully described, and particularly pointed out in the claims.

The same reference characters indicate the same parts of the invention.

Figure 2:
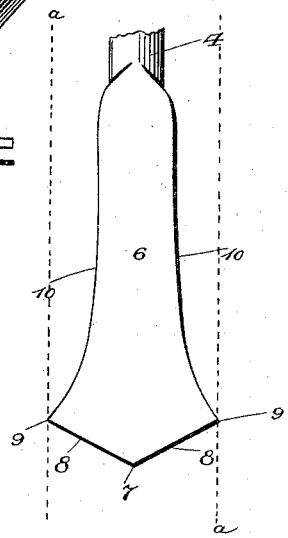
Figure 3:
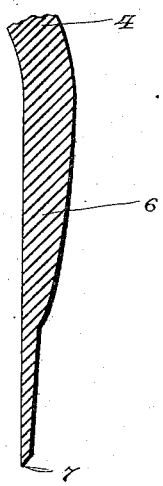

Figure 1 is a perspective view of my improved garden implement. Fig. 2 is a front elevation of one of the hoe-blades, and Fig. 3 is a detail section of the same.

1 denotes an ordinary hoe-handle to receive the shank 2, which is formed with three integral prongs 3, 4, and 5. Each terminates in an integral blade 6. The two lateral prongs 3 and 5 are of uniform size and shape, while the intermediate prong 4 is considerably longer and is curved upwardly above the other two and extends beyond and above them, so that when the handle is held in the usual position all three of the points of the blades will rest evenly on the ground. All three of the blades 6 are identical in form and construction, each being formed with a diamond-shaped point 7, having diverging cutting edges 8 8, which terminate at the lateral shoulders 9 9, from which points the edges 10 10 converge to the prong.

As shown in Fig. 2, it will be noted that the broadest part of the blade is near the point 7 and between the shoulders 9 9, the space between the vertical parallel dotted lines *a a* and the converging edges 10 10 of the blade permitting the soil which has been loosened up by the blade to fall backward over the shoulders 9 9 and drop on the plant or return back again to the furrow made by the blade.

Having thus fully described my invention, what I claim as new and useful, and desire to secure by Letters Patent of the United States, is—

1. A garden implement consisting of the shank 2, formed with uniform lateral prongs 3 and 5 and a longer central prong 4, the latter of which projects upwardly and thence downwardly, each of said prongs terminating in blades 6 formed with a diamond point 7, the lateral cutting edges 8, the shoulders 9, and the inwardly-curved edges 10.

2. A cultivator-blade having a diamond point 7, the lateral cutting edges 8 8, the shoulders 9 9, and the inwardly-curved sides 10 10, substantially as set forth.

In testimony whereof I have hereunto set my hand in presence of two subscribing witnesses.

JACOB MILLER.

Witnesses:
H. J. ENNIS,
J. ALBERT WILLSON.